United States Patent Office 2,774,770
Patented Dec. 18, 1956

2,774,770

SULFUR-CONTAINING AMINES

James F. Kerwin and Glenn E. Ullyot, Philadelphia, Pa., assignors to Smith, Kline & French Laboratories, Philadelphia, Pa., a corporation of Pennsylvania No Drawing. Application September 20, 1951,
Serial No. 247,553

6 Claims. (Cl. 260—332.5)

This invention relates to certain new chemical compounds, more particularly certain new halogen-containing amines and organic and inorganic salts thereof.

The new chemical compounds according to this invention have utility as physiologically active agents and, more particularly have adrenolytic or sympathicolytic activity.

The new compounds according to this invention have the structure shown by the following formula:

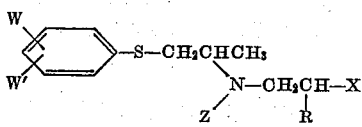

in which:

W and W' are members of the group consisting of hydrogen, alkyl containing not more than 4 carbon atoms, benzyl, hydroxy, alkooxy containing not more than 4 carbon atoms, benzyloxy, fluorine, chlorine, and bromine.

Z is a member of the group consisting of alkyl containing not more than 8 carbon atoms, alkenyl containing not more than 8 carbon atoms, benzyl, benzyl substituted in the phenyl portion by methyl, methoxy, fluorine, chlorine and bromine, phenoxyalkyl the alkyl portion containing not more than 4 carbon atoms and phenoxyalkyl substituted in the phenyl portion by methyl, methoxy, fluorine, bromine and chlorine, and thenyl and thenyl substituted in the thiophene portion by alkyl containing not more than 4 carbon atoms, fluorine, chlorine and bromine.

R is a member of the group consisting of hydrogen and methyl.

X is a member of the group consisting of chlorine and bromine.

Where hereinafter the symbols W, W', R and X are mentioned they will indicate the substituents indicated for them in connection with the above general formula.

The organic and inorganic salts contemplated by this invention include by way of example salts of the bases formed with organic acids such, for example, as glycolic, oxalic, maleic, camphorsulfonic, etc. and inorganic acids such as, for example, sulfamic, hydrochloric, hydrobromic, sulfuric, phosphoric, etc. More specifically, the inorganic and organic salts will be such as are prepared with inorganic and organic acids having an ionization constant not less than $1 \times 10^{-2}$ at 18° C.

The compounds in accordance with this invention and as identified by the above structural formula may be prepared by the following general description of which procedure for the preparation of all of the several compounds will be apparent to those skilled in the art.

The compounds used as starting materials for the synthesis of compounds of this invention are either known substances or, being made obvious, can be prepared by well known methods.

A propylene halohydrin or propylene oxide is added to the sodium salt of a thiophenol of the type

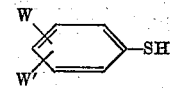

in refluxing alcohol to form the alcohol having the formula:

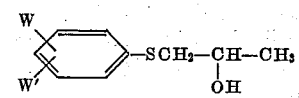

The halide, formed by treating the alcohol with a suitable halogenating agent such as, for example, thionyl chloride, thionyl bromide, etc., is added to ethanolamine or isopropanolamine. When the resulting mixture is heated, the temperature employed depending upon the reactivity of the halide chosen, there is formed the N-substituted amino alcohol of the formula

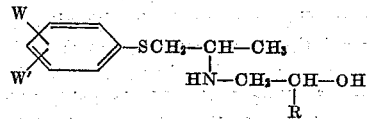

In this process it is advantageous to employ an excess of the primary amino alcohol.

The Z group is introduced into the molecule by heating together the secondary amino alcohol produced above with the appropriate halide, Z—X. This may be carried out either in the presence of excess amino alcohol, or in the presence of an acid binding agent such as potassium carbonate. In most cases the reaction is conveniently carried out in a suitable solvent such as ethyl alcohol, toluene, etc., but it may be carried out without such a solvent.

Finally, the hydroxyl group of the amino alcohol

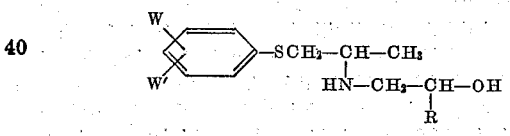

is replaced by a halogen radical X, as in the general formula above. The alcohol is reacted with a halogenating agent such as thionyl chloride or thionyl bromide to yield the product in the form of its hydrohalide salt. An excess of thionyl halide may be employed as solvent for this reaction or chloroform, benzene or other suitable solvent may be used.

The following examples will be illustrative of the various types of compounds and of specific compounds in accordance with the invention and procedure for their preparation and will, it is believed, serve to make fully apparent all of the compounds embraced by the general formula given above and the preparation thereof, respectively, it being noted that the utility indicated for the several compounds flows from the elements of the general structure common to all of them.

EXAMPLE 1

*N-phenylthioisopropyl-N-benzyl-β-chloroethylamine hydrochloride*

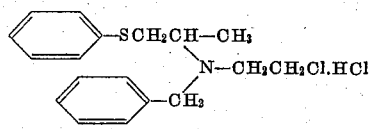

Step 1.—Three hundred milliliters of ethyl alcohol containing 203.2 g. of thiophenol was placed in a three necked, one liter, round bottomed flask, equipped with a dropping funnel, reflux condenser and a mechanical stirrer, and to this was added 88 g. of sodium hydroxide in 100 ml. of water. The mixture was stirred under reflux for 2 hours during the dropwise addition of 180 ml. of propylene chlorohydrin. Stirring and refluxing was continued for an additional 4 hours after which the reaction mixture was cooled and the precipitate removed by filtration. The alcohol was distilled and the crude product taken up in an equal volume of benzene, washed with 10% sodium hydroxide solution and then water. The separated benzene solution was dried and the benzene distilled. Redistillation of the product through a 20 cm. Vigreux in vacuo gave colorless oil, B. P. 73.0–75.5° C./0.2–0.3 mm.

Step 2.—To 73.3 g. of 1-phenylthio-2-propanol, in a flask equipped with a gas inlet tube, dropping funnel and a reflux condenser with a calcium chloride drying tube attached was added dropwise, 59.5 g. of thionyl chloride. After the initial vigorous reaction, the reaction mixture was shaken briefly and allowed to stand for 12 hours. About 0.5 ml. of pyridine was then added and the sulfur dioxide driven off on a steam bath with nitrogen bubbling through the solution for about two hours. The dark red oil residue was taken up in ether and washed with 4–20-ml. portions of dilute hydrochloric acid. The ethereal solution was dried and allowed to stand 12 hours. The ether was removed by distillation and the desired product redistilled through a 20 cm. Vigreux in vacuo; B. P. 71–75° C./0.6–0.65 mm.

Step 3.—To 213.9 g. of hot (about 100–120° C.) redistilled ethanolamine in a 500 ml. flask equipped with a dropping funnel, condenser and stirrer, was added dropwise for a period of two hours a 130.7 g. of 1-phenylthio-2-chloropropane with vigorous stirring. The reaction mixture was refluxed for 10 hours with continued stirring. The mixture was cooled and an alcoholic solution of 56 g. of potassium hydroxide solution added. The precipitated salt was removed by filtration and the mother liquors dried and distilled. Redistillation of the third fraction collected gave N-(1-phenyl-thioisopropyl)-2-aminoethanol with a M. P. of 133–136° C./0.35–0.55 mm.

Step 4.—A solution containing 100 ml. of absolute ethyl alcohol, 16.9 g. of N-(1-phenylthioisopropyl)-2-aminoethanol and 10.1 g. of potassium carbonate was added dropwise for a 1 hour period with stirring to 10.1 g. of benzyl chloride in 300 ml. flask equipped with a stirrer and condenser. The reaction mixture was held at reflux with stirring for 24 hours, after which the solids were removed by filtration and the alcohol distilled. The remaining residue was dissolved in 200 ml. of 10% hydrochloric acid. The solution was cooled to below 5° C. and 6.9 g. of solid sodium nitrite was added with stirring. After ½ hour the cold solution was extracted with 2-100-ml. portions of ether, made basic with 30% sodium hydroxide and the alkaline solutions extracted with 3-100-ml. of ether. The combined ether extracts were washed with water, dried and the ether distilled. The resulting oil was fractionated and the third fraction (B. P. 173–181° C./0.7 mm.) was redistilled using a 20 cm. Vigreux to yield N-(1-phenylthioisopropyl)-N-benzyl-2-aminoethanol; B. P. 183–185° C./0.3–0.35 mm.

Step 5.—A solution of 20.0 g. of thionyl chloride in 100 ml. of dry chloroform was added dropwise during a 2-hour period to a solution of 38.9 g. of N-(1-phenylthioisopropyl)-N-benzyl-2-aminoethanol in 100 ml. of dry chloroform which was stirred and cooled in an ice bath. After a few hours at room temperature the solvent was removed by distillation and the residue dissolved in absolute ethyl alcohol, decolorized with carbon and filtered. On removal of the solvent an oily hygroscopic product was obtained.

EXAMPLE 2

N - phenylthioisopropyl - N - benzyl - β - bromoethylamine hydrobromide

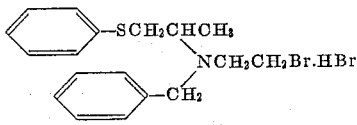

N - phenylthioisopropyl - N - benzyl - 2 - aminoethanol, an intermediate of Example 1, was dissolved in dry chloroform and reacted with thionyl bromide following the procedure of Step 5, Example 1. The N-phenylthioisopropyl-N-benzyl-β-bromoethylamine hydrobromide was obtained upon recrystallization.

EXAMPLE 3

N - (o - methylphenylthioisopropyl) - N - benzyl - β - chloroethylamine hydrochloride

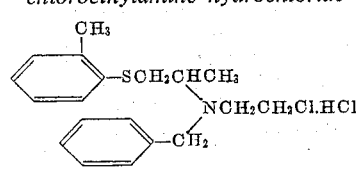

The procedure of Example 1 was followed using an equivalent amount of o-thiocresol in place of thiophenol.

EXAMPLE 4

N - (4 - fluorophenylthioisopropyl) - N - benzyl - β - chloroethylamine hydrochloride

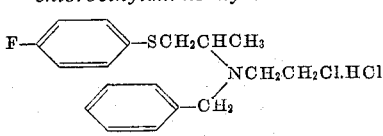

The procedure of Example 1 was followed using an equivalent amount of p-fluorothiophenol in place of thiophenol.

EXAMPLE 5

N - (p - methoxyphenylthioisopropyl) - N - 3,4 - dimethoxybenzyl) - β - chloroethylamine hydrochloride

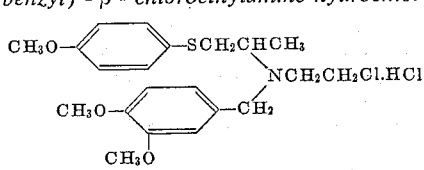

The procedure of Example 1 was followed using an equivalent amount of p-methoxythiophenol in place of thiophenol and using 3,4-dimethoxybenzyl bromide in place of benzyl bromide at step 4.

EXAMPLE 6

N - (2 - isopropyl - 5 - methylphenylthioisopropyl) - N - (o-methylbenzyl)-β-chloroisopropylamine hydrochloride

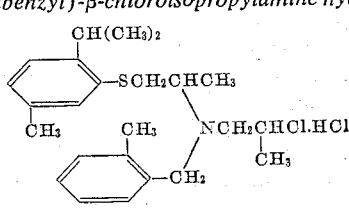

Following the procedure of Example 1, 2-isopropyl-5-methylthiophenol was reacted with propylene chlorohydrin. The hydroxyl group of the resulting alcohol was replaced by chlorine and then reacted with isopropanolamine to form N-(2-isopropyl-5-methylphenylthioisopropyl)-3-aminoisopropanol. Condensation of this material with o-methylbenzylbromide and replacement of the hydroxyl group by chlorine gave the desired product, N-(2- isopropyl - 5 - methylphenylthioisopropyl) - N - (o - methylbenzyl) - β - chloroisopropylamine hydrochloride.

EXAMPLE 7

N - (phenylthioisopropyl) - N - ethyl - β - bromo - ethylamine hydrobromide

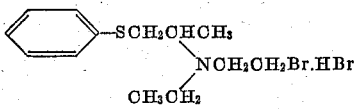

N-phenylthioisopropyl-2-aminoethanol, an intermediate of Example 1, is condensed with ethyliodide to form N - phenylthioisopropyl - N - ethyl - 2 - aminoethanol, which is then treated with thionyl bromide to give the desired product.

EXAMPLE 8

N - phenylthioisopropyl - N - allyl - β - chloroethylamine hydrochloride

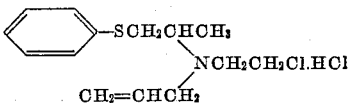

N-phenylthioisopropyl-2-aminoethanol, an intermediate of Example 1, is condensed with allylbromide to form N - phenylthioisopropyl - N - allyl - 2 - aminoethanol, which is then treated with thionyl chloride to give the desired product.

EXAMPLE 9

N - phenylthioisopropyl - N (2 - thenyl) - β - chloro - ethylamine hydrochloride

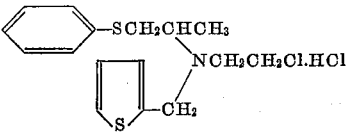

N-phenylthioisopropyl-2-aminoethanol, an intermediate of Example 1, is condensed with 2-chloromethylthiophene to form N-phenylthioisopropyl-N-thenyl-2-aminoethanol, which is then treated with thionyl chloride to give the desired product.

EXAMPLE 10

N - phenylthioisopropyl - N - (5 - chloro - 2 - thenyl) - β - chloroethylamine hydrochloride

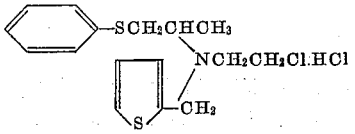

N-phenylthioisopropyl-2-aminoethanol, an intermediate of Example 1, is condensed with 5-chloro-2-chloromethylthiophene to form N-phenylthioisopropyl-N-(5-chloro-2-thenyl)-2-aminoethanol, which is then treated with thionyl chloride to give the desired product.

EXAMPLE 11

N - phenylthioisopropyl - N - phenoxyethyl - β - chloro - ethylamine hydrochloride

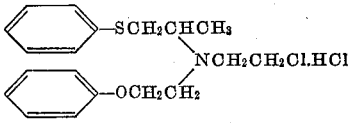

N-phenylthioisopropyl-2-aminoethanol, an intermediate of Example 1, is condensed with phenoxyethylbromide to form N - phenylthioisopropyl - N - phenoxyethyl - 2 - aminoethanol, which is then treated with thionyl chloride to give the desired product.

EXAMPLE 12

N - (4 - chlorophenylthioisopropyl) - N - benzyl - β - chloroethylamine hydrochloride

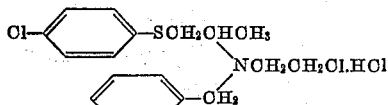

The procedure of Example 1 was followed using an equivalent amount of p-chlorothiophenol in place of thiophenol.

EXAMPLE 13

N - (3,4 - dimethoxyphenylthioisopropyl) - N - benzyl-β-chloroethylamine hydrochloride

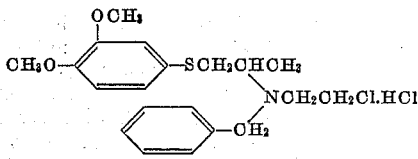

The procedure of Example 1 was followed using an equivalent amount of 3,4-dimethoxythiophenol in place of thiophenol.

EXAMPLE 14

N - phenylthioisopropyl - N - (5 - methyl - 2 - thenyl) - β - chloroethylamine hydrochloride

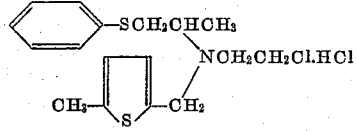

N-phenylthioisopropyl-2-aminoethanol, an intermediate of Example 1, is condensed with 5-methyl-2-chloromethylthiophene to form N-phenylthioisopropyl-N-(5-chloro-2-thenyl)-2-aminoethanol, which is then treated with thionyl chloride to give the desired product.

EXAMPLE 15

N - phenylthioisopropyl - N - (4 - chlorobenzyl) - β - bromoethylamino hydrobromide

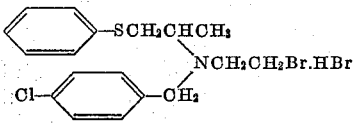

N-phenylthioisopropyl-2-aminoethanol, an intermediate of Example 1, is condensed with 4-chlorobenzylbromide to form N-phenylthioisopropyl-N-(4-chlorobenzyl)-2-aminoethanol, which is then treated with thionyl bromide to give the desired product.

EXAMPLE 16

N - phenylthioisopropyl - N - (4 - chlorophenoxyethyl) - β-chloroethylamine hydrochloride

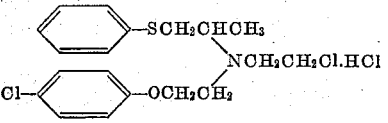

N-phenylthioisopropyl-2-aminoethanol, an intermediate of Example 1, is condensed with p-chlorophenoxyethylbromide to form N-phenylthioisopropyl-N-(4-chlorophenoxyethyl)-2-aminoethanol which is then treated with thionyl chloride to give the desired product.

EXAMPLE 17

*N-prenylthioisopropyl-N-(2-methoxyphenoxyethyl)-β-chloroethylamine hydrochloride*

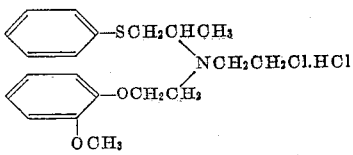

N-phenylthioisopropyl-2-aminoethanol, an intermediate of Example 1, is condensed with o-methoxyphenoxyethylbromide to form N-phenylthioisopropyl-N-(2-methoxyphenoxyethyl)-2-aminoethanol, which is then treated with thionyl chloride to give the desired product.

It will similarly be self-evident to those skilled in the art that in the foregoing examples illustrative of the production of chloride hydrochlorides by the procedures described, bromide hydrobromides will be produced with the use, for example, of thionyl bromide in place of thionyl chloride in the final step. Thus, the foregoing specific examples of chloride hydrochlorides serve as specific examples of bromide hydrobromides by simply replacing Cl.HCl in the several formulae with Br.HBr.

The foregoing examples illustrate the salts contemplated by this invention. The bases contemplated by this invention according to the broad and more particular structural formulae herein disclosed are specifically exemplified as will be obvious to anyone skilled in the art by reference to the foregoing specific examples with the removal from the structures illustrated thereby of the acid group, i. e., HCl or HBr.

As will be apparent, the organic and inorganic salts contemplated by this invention will be prepared from the bases in a manner usual and well known to those skilled in the art, as by neutralizing the bases with organic or inorganic acids.

The bases contemplated by this invention will be formed by carefully interacting the salts contemplated by this invention and herein exhaustively exemplified with one molecular equivalent of a strong alkali such, for example, as sodium hydroxide, potassium hydroxide, lithium hydroxide, or the like, in aqueous solution say, for example, a 1-10% solution at room temperature or below and the bases so liberated are isolated with the aid of a water-immiscible solvent such as ether or benzene.

The compounds contemplated by this invention will be variously optically inactive or optically active and it will be understood that the optically inactive and optically active forms of the compounds contemplated by this invention are all included within the scope of this invention.

The various types of compounds having the structure embodying this invention as illustrated by the above specific examples and examples of the various types of compounds will be readily prepared by the general methods of preparation described above as exemplified by the description of the preparation of the several specific examples. The starting material for the preparation of any given compound within the structure contemplated by this invention will be found among known compounds, or, its structure being obvious with reference to any particular compound desired to be prepared, will be readily prepared by known methods.

This is a continuation-in-part of our application Serial Number 97,926, filed June 8, 1949, now abandoned.

What is claimed is:

1. A compound of the class consisting of a free base and its acid addition salts, the free base having the formula:

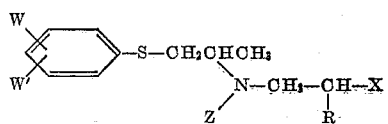

in which W and W' are members of the group consisting of hydrogen, alkyl containing not more than four carbon atoms, alkoxy containing not more than four carbon atoms, fluorine, chlorine and bromine; Z is a member of the group consisting of alkyl containing not more than eight carbon atoms, alkenyl containing not more than eight carbon atoms, benzyl, benzyl substituted in the phenyl portion by methyl, methoxy, fluorine, chlorine and bromine, phenoxyalkyl the alkyl portion containing not more than four carbon atoms and phenoxyalkyl substituted in the phenyl portion by methyl, methoxy, fluorine, bromine and chlorine, and thenyl and thenyl substituted in the thiophene portion by alkyl containing not more than four carbon atoms, fluorine, chlorine and bromine; R is a member of the group consisting of hydrogen and methyl; and X is a member of the group consisting of chlorine and bromine.

2. A compound having the formula:

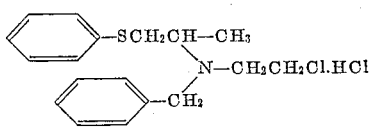

3. A compound having the formula:

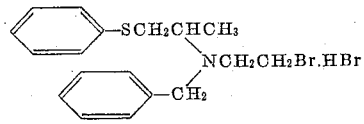

4. A compound having the formula:

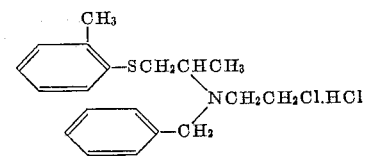

5. A compound having the formula:

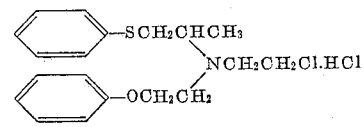

6. A compound having the formula:

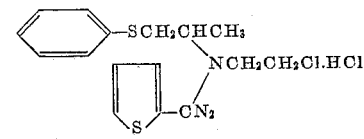

References Cited in the file of this patent

UNITED STATES PATENTS

| Number | Name | Date |
|---|---|---|
| 2,087,131 | Taub et al. | July 13, 1937 |
| 2,495,772 | Rieveschl et al. | Jan. 31, 1950 |
| 2,599,000 | Kerwin et al. | June 3, 1952 |
| 2,599,001 | Kerwin et al. | June 3, 1952 |
| 2,683,719 | Kerwin et al. | July 13, 1954 |

OTHER REFERENCES

Nickerson et al.: "Jour. Pharmacology and Experimental Therapeutics" (1949), vol. 97, pp. 25-47 (received date May 23, 1949).

Wheatley et al.: JACS, vol. 72 (Apr. 1950), pp. 1655-8.